Aug. 8, 1967 K. A. MILETTE 3,334,661
PIPE UNION
Filed Jan. 3, 1964 3 Sheets-Sheet 2
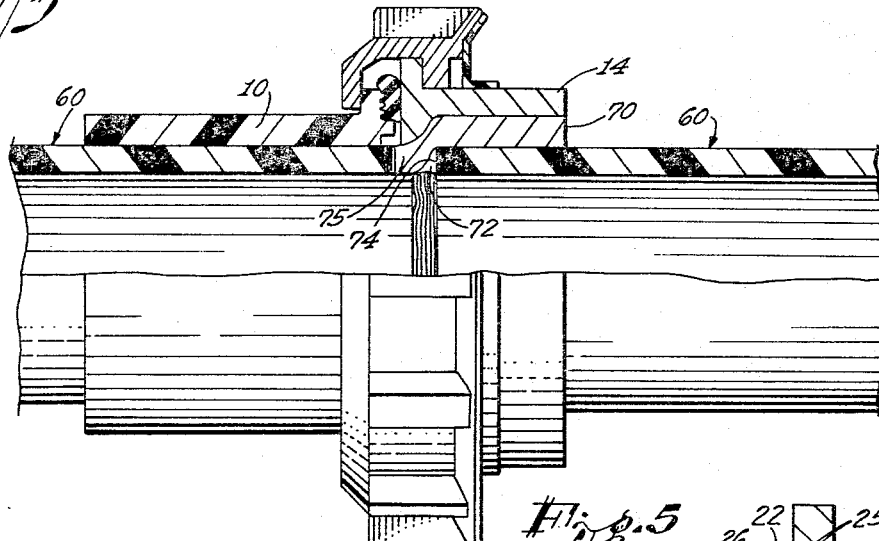
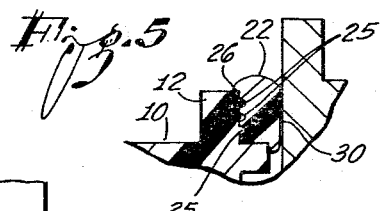
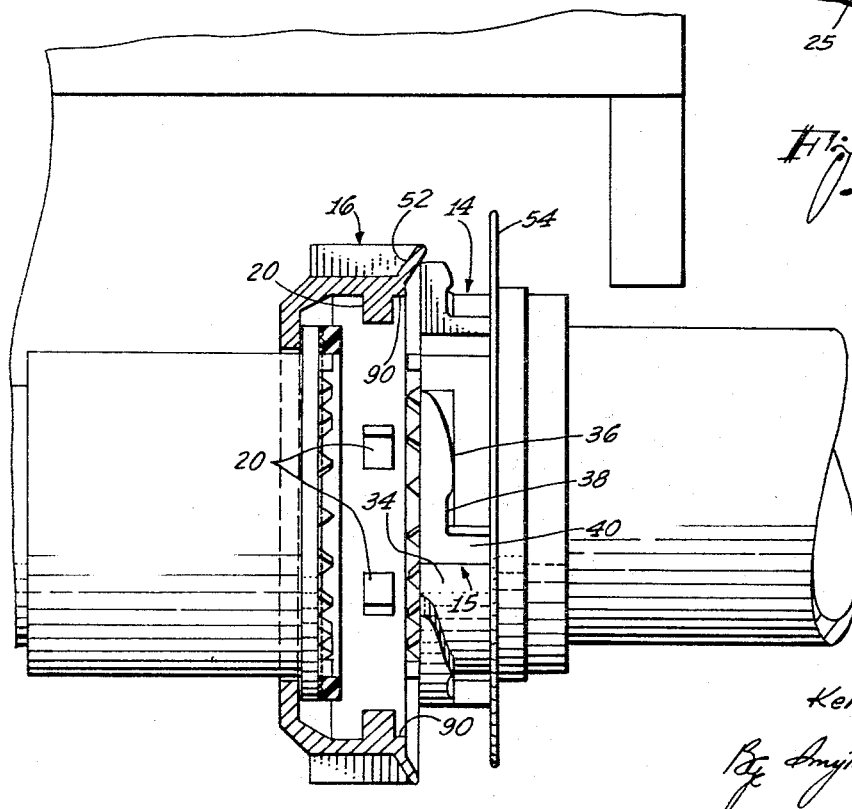
INVENTOR.
Kenneth A. Milette
Attorneys

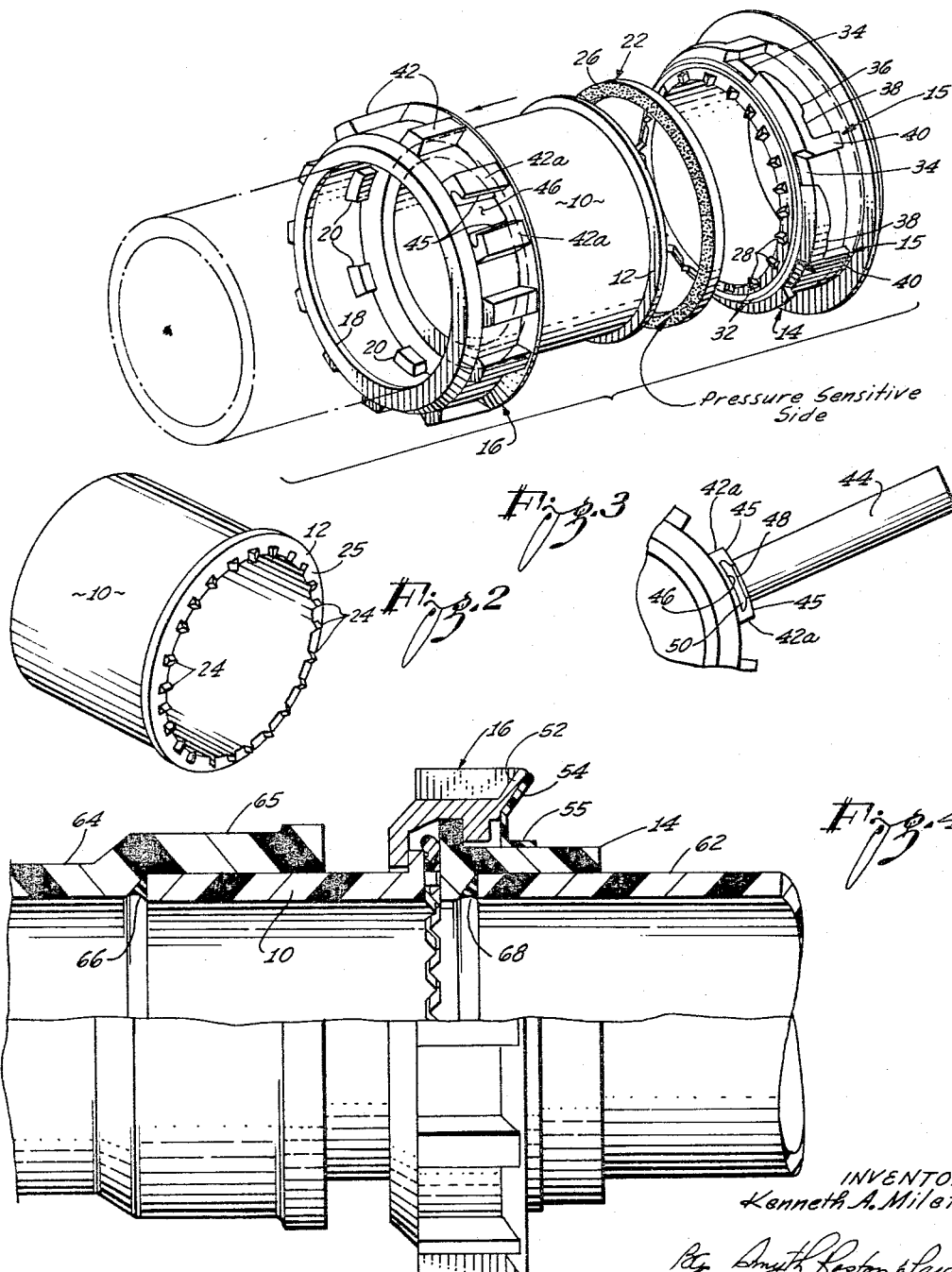

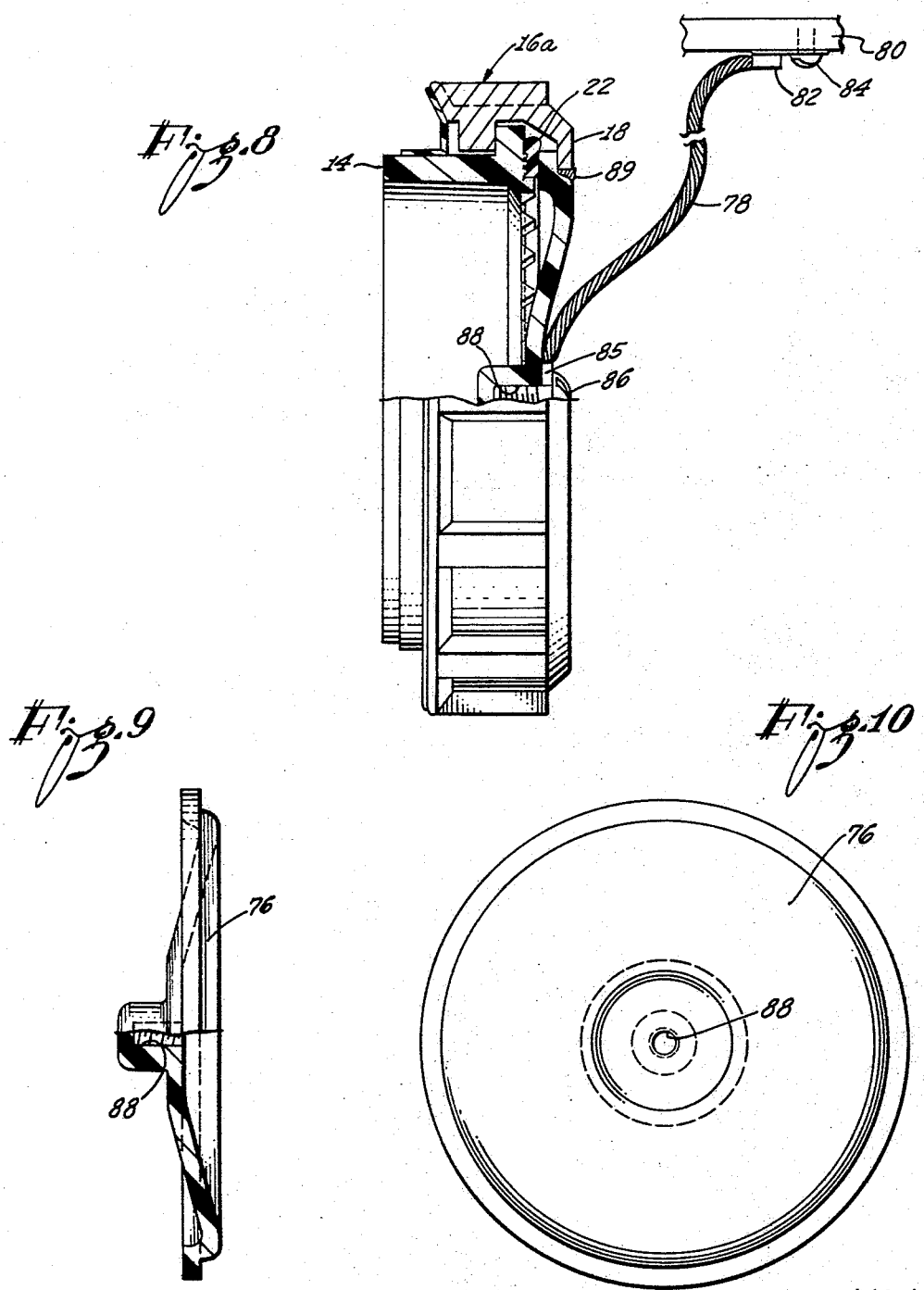

# United States Patent Office 3,334,661
Patented Aug. 8, 1967

3,334,661
PIPE UNION
Kenneth A. Milette, 16103 Lear Court,
Valinda, Calif. 91744
Filed Jan. 3, 1964, Ser. No. 335,551
5 Claims. (Cl. 138—89)

This invention relates to a releasable joint structure for interconnecting two pipe ends and, more particularly, relates to such a joint structure of the type commonly termed a pipe union. Typically, such a pipe union includes a first externally flanged sleeve for connection to one pipe end, a second sleeve adapted for connection to the other pipe end and formed with a set of external lugs, and an outer flange ring member dimensioned to telescope over the two sleeves in engagement with the flange of the first sleeve and formed with a set of internal lugs to releasably engage the external lugs of the second sleeve.

While the invention is broadly applicable for its purpose, it has special utility as embodied for use to releasably connect a waste pipe of a house trailer or the like to a sewer pipe. By way of illustration and example, the present disclosure is directed to such an embodiment and will provide adequate guidance to those skilled in the art who may have occasion to embody the same principles in devices for other specific purposes.

The invention meets certain needs for improvements in such a pipe union as adapted for use on a house trailer or the like.

One need is to achieve economy by providing a union assembly that may be used for joining either a pair of 1½" plastic pipe ends or a pair of 2" plastic pipe ends. As will be explained, the invention meets this need by a union assembly dimensioned to fit two confronting ends of 1½" pipe, which assembly includes a bushing or spacer sleeve that may be discarded to adapt the assembly for joining together the confronting ends of 2" pipe.

Another need arises from the fact that the end of the waste pipe carried by a house trailer extends downward through the floor to the space under the trailer. Consequently, the pipe end is not conveniently accessible and it is an awkward fumbling task to manipulate the ring of a pipe union for connecting the waste pipe to a sewer pipe. The need is for some provision to facilitate this task and for this purpose the invention provides the ring with a flared rim which makes helpful guiding engagement with a cooperating sleeve of the union and guides the ring and the cooperating sleeve into concentric relation for mutual engagement.

Another need is for some simple provision to cause the relatively rotatable coupling parts to engage each other with a detent action to hold the parts in locking position in a yielding manner. The feature of the invention in this regard is the use of the resiliency of a sealing ring to provide the required yielding action, the sealing ring being thus given an additional function. It is also a feature of the invention that the sealing ring surrounds and encloses two mutually engaged sets of circumferential teeth that serve to prevent relative rotation of the two sleeve members of the union assembly.

A further need met by the invention is the provision of means to close and seal the end of the waste pipe under the house trailer when the house trailer is in transit. For this purpose the invention provides a cap assembly which is suspended by a flexible cable when not in use and which cooperates with parts of the union assembly. A further features in this regard is the provision of a flexible dust flange which keeps foreign material out of the cap assembly when the house trailer is in transit.

The features and advantages of the invention may be understood from the following detailed description and the accompanying drawings.

In the drawings which are to be regarded as merely illustrative:

FIG. 1 is an exploded perspective view of a union asasembly embodying the invention;

FIG. 2 is a perspective view of one of the two sleeves of the assembly shown in FIG. 1;

FIG. 3 is a fragmentary elevational view showing how a radial handle member may be releasably mounted on the ring in FIG. 1;

FIG. 4 is a side elevational view partly in section of the union assembly interconnecting a pair of confronting pipe ends of relatively large diameter;

FIG. 5 is an enlarged fragmentary sectional view showing how circumferential ribs of a sleeve penetrate an annular sealing member;

FIG. 6 is a view similar to FIG. 4 showing the union assembly with an added bushing interconnecting two pipe ends of smaller diameter;

FIG. 7 is a view partly in side elevation and partly in section showing how the flared leading rim of the ring cooperates in a guiding manner with the external lugs of one of the sleeves to facilitate assembly of the union;

FIG. 8 is a view partly in side elevation and partly in section showing a cap assembly mounted on the end of an annular pipe;

FIG. 9 is a side elevational view partly in section of the disk member of the assembly shown in FIG. 8; and FIG. 10 is a face view of the cap member.

The principal parts of the pipe union assembly shown in FIG. 1 include: a first sleeve 10 having a radial circumferential flange 12 on its leading end; a second sleeve 14 having a circumferential set of angular external lugs 15; a ring, generally designated 16, having an inner circumferential flange 18 for engagement with the flange 12 of the first sleeve 10 and further having a set of inner circumferential lugs 20 for releasable engagement with the lugs 15 of the second sleeve 14; and a resiliently yieldable annular sealing member 22 for compression between the leading ends of the two sleeves 10 and 14.

The two sleeves 10 and 14 and the ring 16 may be made of various materials including various corrosion-resistant metals and plastic. In this instance, the three members of the union assembly are made of a suitable relatively rigid plastic material.

As may be seen in FIG. 2, the radial flange 12 on the leading end of the first sleeve 10 has a circumferential set of tapered teeth 24 in an inner circumferential zone and has three thin concentric ribs 25 (best shown in FIG. 5) in an outer radial zone surrounding the teeth 24, the purpose of the ribs being to penetrate the sealing member 22 with sealing action. The second sleeve 14 has a circumferential series of tapered teeth 26 and further has a flat radial surface 28 in an outer radial zone that surrounds the radial zone of the tapered teeth. The annular sealing member 22 which is made of suitable resiliently yieldable rubber-like material surrounds the teeth 26 and backs against the radial surface 28. In the present embodiment of the invention, the annular sealing member 22 is provided with a pressure sensitive adhesive coating on one of its two faces to bond with the radial surface 28 of the second sleeve 14. It is apparent that the two series of tapered teeth 24 and 26 provide shoulders which interlock when the two sleeves are drawn together.

As best shown in FIGS. 1 and 7, the external angular lugs 15 of the second sleeve 14 are separated by spaces 34 which are dimensioned to pass the inner circumference of the inner lugs 20 of the ring 16. Each of the angular lugs 15 has a circumferentially directed leg which is formed with both a sloping cam shoulder 36 and an adjacent recess 38, the angular lugs being further formed with an axial leg 40 which serves as a stop adjacent the recess 38.

It is apparent that with the second sleeve 14 and the ring 16 positioned concentrically and with the internal lugs 20 of the ring aligned with the spaces 34, the ring may be telescoped over the second sleeve with the internal lugs 20 passing through the corresponding spaces 34. The ring may then be rotated relative to the second sleeve to cause the internal lugs 20 to slide over the cam shoulders 36 to come to rest in the corresponding recesses 38.

The parts are so dimensioned and positioned relative to each other that the movement of the internal lugs over the cam shoulders 36 is resisted by resilient compression of the annular sealing member 22. The compression of the annular sealing member 22 is within its elastic limits and when the internal lugs 20 seat in the recesses 38 the annular sealing member remains under resilient compression to exert sealing pressure between the confronting radial surfaces of the ring and the second sleeve respectively.

When the annular sealing member 22 is compressed in this manner the three circular ribs 32 penetrate the material of the annular sealing member with sealing effectiveness. It is to be noted that because of its adhesive coating, the annular sealing member 22 adheres to the second sleeve 14 and is carried by the second sleeve. It is apparent that the annular sealing member 22 resiliently resists reverse releasing rotation of the ring 16 relative to the second sleeve 14.

The ring 16 is formed with an outer circumferential series of lugs 42 to facilitate manual rotation of the ring. A feature of the selected embodiment of the invention is that at least one pair of the lugs 42 is adapted to releasably engage and mount a suitable radial handle 44 in the manner indicated in FIG. 3. For this purpose two lugs of the pair of lugs 42 are elongated axially of the ring, as shown in FIGS. 1 and 3, a pair of lugs designated 42a are formed with overhanging flanges 45 that are directed towards each other so that the pair of ribs form a channel 46 with overhanging walls. The handle 44 is formed with a neck 48 to pass between the two lugs 42a and is further formed with a base portion 50 that is dimensioned to slide into the channel 46 in a snug sliding manner. It is apparent that the handle 44 may be quickly and easily mounted radially on the ring 16 whenever the use of such a handle is needed to manipulate the ring.

The leading rim of the ring 16 is flared and for this purpose the leading rim of the ring is formed with a flared lip 52. The maximum diameter of the flared surface of the flared lip 52 substantially exceeds the outside diameter of the circle defined by the angular lugs 15.

A feature of the invetnion is the provision of a continuous radial flange 54 on the outer circumference of the second sleeve 14 positioned for abutment by the flared leading end of the ring 16 when the ring is engaged with the second sleeve. As best shown in FIG. 4 the flange 54 is the radial portion of a plastic ring having a cylindrical portion 55 which embraces the second sleeve 14 and is bonded to the outer circumferential surface thereof. It is apparent from an inspection of FIG. 4 that the flexible resilient flange 54 is positioned for abutment and flexure by the ring 16 to create a helpful sealing pressure between the flange and the ring. It is further apparent that the flexible flange 54 cooperates with the flared leading end of the ring 16 to cut off the interlocking lugs 20 and 15 from the exterior of the device when the union is assembled.

To understand a special advantage of the invention, FIG. 6 shows two pieces of plastic pipe 60 of relatively small diameter interconnected by the union assembly and FIG. 4 shows a pair of plastic pipes of larger diameter interconnected by the union assembly, the pair of pipes of the larger diameter comprising a pipe 62 with a plain end and a pipe 64 with a bell or socket end 65. The two pipes that are connected together in FIG. 6 are 1½" plastic pipes, their inside diameter being substantially 1½". The two larger pipes shown in FIG. 2 are 2" plastic pipes, their inside diameter being substantially 2". Pipes of either size have plain ends and socket ends which are dimensioned to telescope over the plain ends. For the purpose of using the union assembly of the present invention, the two ends of the smaller pipe shown in FIG. 6 are plain ends, but in FIG. 4 the union assembly cooperates with the plain end of the pipe 62 and cooperates with the bell or socket 65 of the pipe 64.

As may be seen in FIG. 6 the inside diameter of the first sleeve 10 is of substantially the outside diameter of the pipe 60 to permit the first sleeve to be telescoped over the pipe end and to be bonded thereby by suitable cement. On the other hand, as may be seen in FIG. 2 the outside diameter of the first sleeve 10 is substantially equal to the inside diameter of the bell or socket end 65 of the pipe 64 to permit the first sleeve to be telescoped into the bell or socket end and bonded thereto by suitable cement 66. As may be seen in FIG. 6 the inside diameter of the second sleeve 14 is substantially equal to the outside diameter of the corresponding plain pipe end 62 to permit the second sleeve to be telescoped over the plain pipe end and to be bonded thereto by suitable cement 68.

The union assembly shown in FIG. 6 includes a bushing 70 having an outside diameter substantially equal to the inside diameter of the second sleeve 14 and having an inside diameter substantially equal to the outside diameter of the pipe 60 to permit the bushing to be telescopically interposed between the second sleeve and the pipe 60 and to be bonded thereto by suitable cement. FIG. 6 shows cement 72 bonding the bushing to the pipe 60. The bushing overhangs the end of the corresponding pipe 60 and has an inner circumferential shoulder 74 that abuts the end of the pipe 60. The overhanging portion 75 of the bushing 70 is reduced to substantially the same inside diameter as the pipe 60. Thus the two pipes 60 and the overhanging portion 75 of the bushing 70 together with the cement 72 form a substantially uniform continuous inner circumferential surface.

It is apparent that the union assembly including the bushing 70 may be sold to purchasers for use interchangeably with the two different sizes of plastic pipe. When the union assembly is used with the smaller 1½" pipe, the bushing 70 is used as shown in FIG. 6, but when the union assembly is used with the larger 2" pipe as shown in FIG. 4 the bushing is discarded.

The invention is intended specifically to be used on the end of a waste pipe that extends downward through the floor of a house trailer or like vehicle. The waste pipe end may be either the waste end 62 of FIG. 4 or the right hand waste pipe 60 in FIG. 6. Considering FIG. 4, for example, the waste pipe end 62 that extends downward from the floor of the house trailer is connected to a stationary sewage pipe whenever the house trailer stands for a substantial period of time at a trailer park. Thus in FIG. 4, the union assembly releasably connects the waste pipe 62 to the sewage pipe 64. In like manner in FIG. 6, the union assembly releasably connects a waste pipe end 60 on the right side of the figure to a sewage pipe 60 on the left side of the figure.

FIG. 8 shows a cap means that may be used in cooperation with the second sleeve 14 to close off an open end of a downwardly directed waste pipe under a house trailer when the house trailer is on the road. The pipe end that is closed by the cap means may be either the pipe end 60 to which the second sleeve 14 is attached by the bushing 70 in FIG. 8 or may be the pipe end 62 to which the second sleeve 14 is directly attached in FIG. 4.

The cap means shown in FIG. 8 comprises a previously described ring 16a, a disk 76 and a flexible member in the form of a short cable 78 that serves the purpose of anchoring the disk to the floor 80 or other adjacent support structure under the house trailer. The cable is provided with an eyelet 82 to receive a screw 84 anchored to the support structure 80. The other end of the cable is connected to an eyelet 85 that is engaged by a screw 86 that threads into a blind bore 88 of the disk.

When the cap means is in use as shown in FIG. 8, the inner circumferential flange 18 of the ring 16a overlaps engages the circumferential margin of the disk 76 and cooperates with the second sleeve 14 in the manner heretofore described to tighten the disk against a previously described annular sealing member 22. In FIG. 8 suitable cement 89 bonds the disk 76 to the ring 16a but the disk may separate from the ring as shown in FIGS. 9 and 10.

When the sewage connection under the house trailer is broken in preparation for the house trailer taking the road, the cap means shown in FIG. 8 is employed to close and seal the open end of the waste pipe. The cap means is always available for this purpose because it is anchored to the trailer by the screw 84 and it is to be noted that if the ring 16a is separate from the disk 76 it is held captive by the cable in cooperation with the disk. The ring 16a is assembled to the second sleeve 14 in the same manner as the ring 16 that it replaces.

When it comes time to make a new connection with a sewer at a different trailer park, the ring 16a is removed and the pipe union is again assembled. It is to be noted that whenever it is necessary to assemble a ring 16 or a ring 16a to a second sleeve 14, the flared rim of the ring in the form of the previously mentioned flared lip 52 serves as means to guide the ring into the desired concentric relationship with the second sleeve 14. Thus in FIG. 7, it can be seen that the rim of the second sleeve that is formed by the angular lugs 15 makes sliding contact with the face of the flared lip 52 so that manually urging the ring towards the second sleeve tends to cam the ring into the desired concentric relationship.

More often than not, the inner lugs 20 of the sleeve 16 do not register with the spaces 34 between the successive angular lugs 15 so that the inner lugs 20 initially seat against the angular lugs 15. With slight rotation, however, the inner lugs 20 are aligned with the spaces 34 to permit the coupling action. It is to be noted in FIG. 7 that the guiding surface of the tapered lip 52 leads directly to the inner circumferential surface of the ring 16 and that the inner lugs 20 are set back slightly. Thus, the inner circumferential surface together with the inner lugs 20 form a circular seat that temporarily rotatably confines the external angular lugs 15 while the ring 16 is being rotated to bring the internal lugs into alignment with the spaces 34.

My description in specific detail of the selected embodiment of the invention will suggest various changes, substitutions and other departures from my disclosure within the spirit and scope of the appended claims.

I claim:

1. In a union assembly of the character described for interconnecting two pipe ends, wherein the assembly includes a first externally flanged sleeve for connection to one of the two pipe ends, a second sleeve formed with circumferential spaced external lugs and adapted for connection to the other of the two pipe ends, and a ring dimensioned to telescope over both of the sleeves and internally flanged to engage the first sleeve in a rotatable manner, the ring being formed with a set of circumferentially spaced internal lugs for engagement with the set of external lugs of the second sleeve in response to rotation of the ring relative to the second sleeve, the improvement comprising:

said ring having a flared leading rim with the maximum diameter of the flared surface of the rim substantially larger than the leading rim of the second sleeve for guiding sliding contact with the leading rim of the second sleeve to bring the two rims into concentric relationship in response to relative axial movement of the ring and the second sleeve towards each other for concentric alignment of the two sets of lugs in preparation for mutual engagement of the two sets of lugs; and the addition of a continuous outer circumferential flexible resilient flange on the second sleeve positioned for abutment with the flared leading rim of the ring to close off the mutually engaged sets of lugs from the exterior of the assembly when the ring is engaged with the second sleeve.

2. In a union assembly of the character described for interconnecting two pipe ends, wherein the assembly includes a first externally flanged sleeve for connection to one of the two pipe ends, a second sleeve formed with circumferential spaced external lugs and adapted for connection to the other of the two pipe ends, and a ring dimensioned to telescope over both of the sleeves and internally flanged to engage the first sleeve in a rotatable manner, the ring being formed with a set of circumferentially spaced internal lugs for engagement with the set of external lugs of the second sleeve in response to rotation of the ring relative to the second sleeve, the improvement comprising:

said ring having a flared leading rim with the maximum diameter of the flared surface of the rim substantially larger than the leading rim of the second sleeve for guiding sliding contact with the leading rim of the second sleeve to bring the two rims into concentric relationship in response to relative axial movement of the ring and the second sleeve towards each other for concentric alignment of the two sets of lugs in preparation for mutual engagement of the two sets of lugs, the internal lugs of the ring are spaced axially inward from the flared leading rim to form with the inner circumferential surface of the ring a circular seat for temporarily seating the external lugs when the external lugs are out of register with the spaces between the successive internal lugs.

3. A union assembly adapted for use interchangeably to join two different pairs of ends of plastic pipes of different nominal sizes, namely, a first pair comprising two plain plastic pipe ends of a nominal size of 1½" of a first outside diameter and a second pair of plastic pipe ends of a nominal size of 2", one of the pipe ends of the second pair having a second outside diameter and the other pipe end of the second pair being a socket pipe end of a given inside diameter slightly larger than the second outside diameter, said assembly comprising:

a first sleeve of an inside diameter slightly larger than the first outside diameter to telescope over one pipe end of the first pair of pipe ends for bonding thereto and of an outside diameter slightly smaller than said given inside diameter to telescope into said socket pipe end for bonding thereto;

a second sleeve of an inside diameter slightly larger than the second outside diameter to telescope over said other pipe end of the second pair of pipe ends for bonding thereto;

a bushing of an inside diameter slightly larger than the first outside diameter to telescope over one of the pipe ends of the first pair of pipe ends for bonding thereto and of an outside diameter slightly smaller than the inside diameter of the second sleeve to telescope into the second sleeve for bonding thereto;

a union ring dimensioned to telescope over the confronting ends of the two sleeves; and cooperating means on the union ring and on the two sleeves for engagement to interconnect the two sleeves.

4. An assembly as set forth in claim 3 which includes a disk member dimensioned to span and close the forward end of the second sleeve, said disk member being shaped and dimensioned for engagement by the union ring for retention of the disk member against the second sleeve whereby when the first sleeve and the second sleeve are released by the ring for separation of two pipe ends, the disk member may be substituted for the first sleeve to close one of the pipe ends.

5. An assembly as set forth in claim 4 which includes an elongated flexible member connected to the disk member to retain the disk member when the disk member is not in use.

References Cited

UNITED STATES PATENTS

| | | | |
|---|---|---|---|
| 797,152 | 8/1905 | Sheckler | 285—12 |
| 882,406 | 3/1908 | Morgan | 285—27 |
| 893,554 | 7/1908 | Onge | 285—360 |
| 1,097,508 | 5/1914 | Bailey | 285—362 X |
| 1,965,915 | 7/1934 | Wilson | 285—362 |
| 2,080,271 | 5/1937 | Hirst | 285—177 |
| 2,159,811 | 5/1939 | Leonardo | 285—12 |
| 2,244,939 | 6/1941 | Carlson | 285—238 |
| 2,283,974 | 5/1942 | Dillon | 285—360 X |
| 2,333,243 | 11/1943 | Glab | 285—330 X |
| 2,431,172 | 11/1947 | Harrison | 285—177 |
| 2,518,829 | 8/1950 | Smith | 285—284 X |
| 2,933,428 | 4/1960 | Mueller | 285—21 X |
| 3,036,601 | 5/1962 | Fabrian et al. | 138—89 |
| 3,039,494 | 6/1962 | Bradley | 138—89 |

FOREIGN PATENTS 984,036   2/1965   Great Britain.

CARL W. TOMLIN, *Primary Examiner.*

THOMAS F. CALLAGHAN, *Examiner.*

T. A. LISLE, *Assistant Examiner.*